(12) United States Patent
Glasl

(10) Patent No.: US 8,210,230 B2
(45) Date of Patent: Jul. 3, 2012

(54) WINDING SHAFT FOR A ROLLER BLIND DEVICE

(75) Inventor: Sebastian Glasl, Vieruheim (DE)

(73) Assignee: Webasto AG, Stockdorf (DE)

( * ) Notice: Subject to any disclaimer, the term of this patent is extended or adjusted under 35 U.S.C. 154(b) by 0 days.

(21) Appl. No.: 11/995,728

(22) PCT Filed: Jul. 14, 2006

(86) PCT No.: PCT/DE2006/001225
§ 371 (c)(1),
(2), (4) Date: Jan. 15, 2008

(87) PCT Pub. No.: WO2007/009438
PCT Pub. Date: Jan. 25, 2007

(65) Prior Publication Data
US 2008/0196846 A1    Aug. 21, 2008

(30) Foreign Application Priority Data
Jul. 15, 2005   (DE) .......................... 10 2005 033 275

(51) Int. Cl.
*E06B 9/56*   (2006.01)
*A47G 5/02*   (2006.01)
*A47H 1/00*   (2006.01)
*F16F 1/12*   (2006.01)
(52) U.S. Cl. ......... 160/318; 160/313; 267/155; 267/179
(58) Field of Classification Search .................. 160/313, 160/318, 323.1, 315; 185/45; 267/154, 155, 267/170, 174, 178, 179
See application file for complete search history.

(56) References Cited

U.S. PATENT DOCUMENTS

| | | | | |
|---|---|---|---|---|
| 958,605 A | * | 5/1910 | Doring | 160/313 |
| 1,240,580 A | * | 9/1917 | Kirsch et al. | 160/313 |
| 1,258,940 A | * | 3/1918 | Paul | 160/318 |
| 1,605,111 A | * | 11/1926 | Holt et al. | 160/313 |
| 1,641,506 A | * | 9/1927 | Smurr | 160/315 |
| 1,775,364 A | * | 9/1930 | Holt et al. | 160/301 |
| 1,900,259 A | | 3/1933 | Sevison | |
| 1,938,729 A | | 12/1933 | Clifford | |
| 4,222,601 A | * | 9/1980 | White et al. | 296/37.16 |
| 4,317,480 A | * | 3/1982 | Phelps | 160/23.1 |
| 4,672,713 A | * | 6/1987 | Newton et al. | 16/197 |
| 5,964,426 A | * | 10/1999 | Tabellini | 242/372 |
| 5,996,923 A | * | 12/1999 | Junquera | 242/375.3 |
| 6,116,321 A | * | 9/2000 | Kavchar | 160/100 |

FOREIGN PATENT DOCUMENTS

| | | |
|---|---|---|
| DE | 20116309 | 1/2002 |
| EP | 1122400 | 8/2001 |
| FR | 1070257 | 7/1954 |
| FR | 1163320 | 9/1958 |
| FR | 2010004 | 2/1970 |

* cited by examiner

*Primary Examiner* — Blair M Johnson
*Assistant Examiner* — Jaime F Cardenas-Garcia
(74) *Attorney, Agent, or Firm* — Fitch, Even, Tabin & Flannery, LLP

(57) ABSTRACT

The invention relates to a winding shaft for a roller blind device with a winding tube (2) and a torsional tensioning device (7) that, with a first end (7a), is coupled to the winding tube (2) in a manner that enables it to rotate in relation thereto. The torsional tensioning device (7), at least with a second end, is coupled to the winding tube (20 so that it is rotationally fixed and axially displaceable in relation thereto.

8 Claims, 3 Drawing Sheets

WINDING SHAFT FOR A ROLLER BLIND DEVICE

This application is a 35 U.S.C. §371 National Stage entry of PCT/DE2006/001225, filed Jul. 14, 2006, which claims priority from German Patent Application No.: DE 10 2005 033275.7, filed Jul. 15, 2005, the contents of which are herein incorporated by reference.

The invention relates to a winding shaft for a roller blind device, in particular for motor vehicles, as per the preamble of claim 1.

DE 196 40 846 A1 discloses a roller shaft for winding up and unwinding a flexible sheet, with the roller blind shaft being mounted at the end side in side parts so as to be rotatable about its longitudinal axis. Arranged in the interior of the roller blind shaft is a spiral torsion spring which extends from a holding ring, which is likewise arranged in the interior of the roller blind shaft, to a rotary element which is arranged at the end side with respect to the roller blind shaft. The spiral torsion spring is in each case rotationally fixedly connected to the rotary element and the holding ring by means of support pins. The holding ring is rotationally fixed with respect to the roller blind shaft and is fixed in the roller blind shaft in an axially fixed manner by means of indentations. The unwinding of a roller blind web from a roller blind shaft of said type causes the spiral torsion spring to be preloaded, so that a torque can be exerted on the unwound roller blind web in a winding-up direction. The spiral torsion spring is arranged in a tonsillar sleeve which is likewise arranged within the roller blind shaft. To minimize noise, it is proposed to install the spiral torsion spring in its axial longitudinal direction in such a way that, in all operating states of the spiral torsion spring, it is ensured that successive spiral windings do not come into contact with one another, and the operating noise level is therefore reduced in order to avoid friction noises. In the case of a roller blind shaft of said type; it is disadvantageous that the noise generation during the operation of the roller blind shaft is not optimal. In addition, the fixing of the holding ring in the roller blind shaft by means of indentations results in non-circular running of the roller blind shaft, which results in additional alignment expenditure and additional measurement steps in order to determine the out-of-roundness of the roller blind shaft.

DE 42 11 940 A1 discloses a spring shaft in which a coil torsion spring is provided which is coupled with at least one end to a sleeve in that the spring wire coils partially engage in a matching external thread of said sleeve. At the other end, the coil torsion spring is rotationally fixedly coupled to a further sleeve, the diameter of the coil torsion spring is selected here such that a drive motor can be arranged in the interior of the coil torsion spring. A spring shaft of said type is of complex construction and, with regard to noise generation, is also not sufficiently quiet, EP 1 009 904 B1 discloses a winding-up mechanism for roller blinds in which a spiral torsion spring exerts a torque on the winding shaft in order to wind up the roller blind web. The free rotatability of the roller blind shaft can be influenced by means of friction-generating measures, for example a follower which, loaded by means of a pressure spring, runs on a thread, so that a controlled raising and stopping of the roller blind in its upper position is made possible. A disadvantage of said winding mechanism is that it likewise generates undesired noises and is additionally of complex construction.

DE 200 11 452 U1 discloses a winding shaft for a roller blind which has a roller blind axle and a winding tube which is rotatably mounted on the roller blind axle ant onto which and from which the roller blind web can be wound and unwound. Arranged around the roller blind axle is a coiled spiral spring as a spiral torsion spring which is fastened with one end to the tube axis and with the other end to the winding tube. For noise damping, it is proposed to provide a noise-damping layer between the winding tube and the spiral spring in order to prevent an abutment of the spiral spring windings against the winding tube. The noise generation of a winding shaft of said type is not satisfactory.

It is an object of the invention to specify a winding shaft for a roller blind device which is optimized in terms of noise in operation. It is also an object of the invention to specify a winding shaft which has an optimized true running, and in addition, it should be possible to produce the winding shaft in a simple, cost-effective and robust manner.

In addition, it should be possible to produce the individual parts with the most cost-effective production methods possible and from the most cost-effective materials possible.

The object is achieved by means of a winding shaft for a roller blind arrangement having the features of claim 1. Advantageous refinements are specified in the subclaims.

The invention is explained in more detail by way of example on the basis of the drawing, in which:

FIG. 1 schematically shows a longitudinal section through a winding shaft according to the invention;

Figure 1:
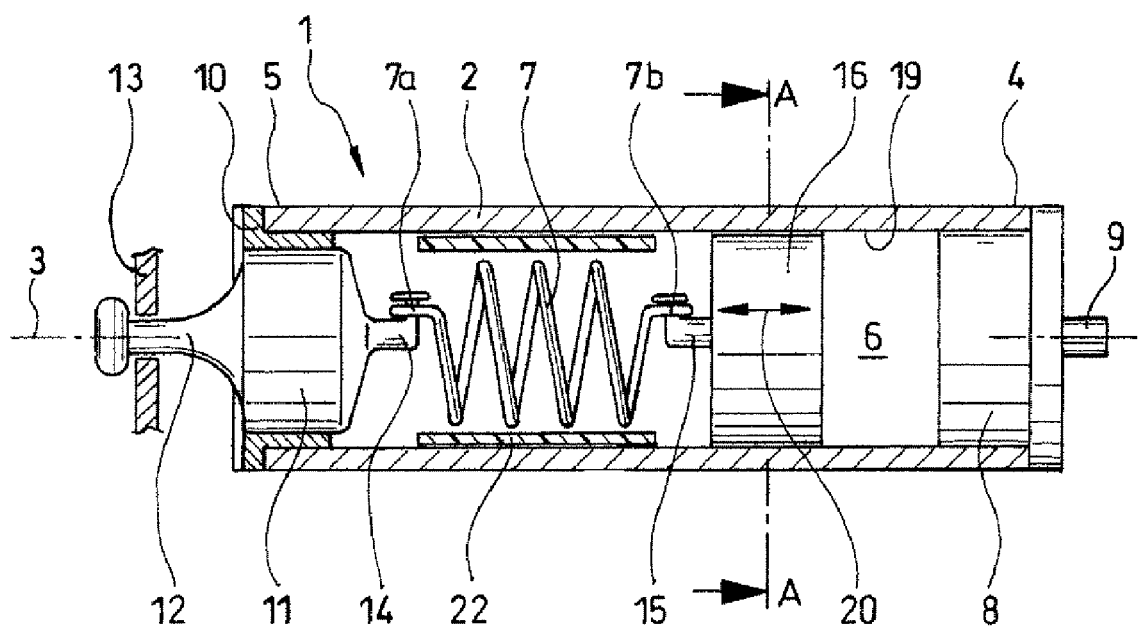

It was found according to the invention that a spiral torsion spring, during tensioning or relaxation in the torsional direction about its longitudinal axis, simultaneously undergoes a change in length in the axial direction. In the event of torsional distortion in the winding direction of the spiral torsion spring, with every rotation, the spiral torsion spring becomes longer by approximately a wire thickness of the spring wire which forms the spiral torsion spring. In the event of torsional distortion in the opposite direction, the spiral torsion spring undergoes a corresponding shortening by a wire thickness per revolution. All spiral torsion springs in roller blind shafts from the prior art therefore undergo axial distortion within the roller blind shaft during the actuation of the roller shaft, for example by pulling the roller blind web down, which can possibly cause the spring to vibrate and can therefore incite noise generation. Said noise generation is prevented according to the invention in that the spiral torsion spring remains undistorted in its longitudinal direction in all operating states of the roller blind shaft. This is obtained in that at least one bearing arrangement of the spiral torsion spring is mounted so as to be rotationally fixed and longitudinally movable in the longitudinal direction of the roller blind shaft, so that length compensation can take place during operation.

A winding shaft 1 according to the invention (FIG. 1) has a winding tube 2. A roller blind web (not shown) is arranged on the winding tube 2 such that it can be wound up and unwound. The winding tube 2 has a central longitudinal axis 3, a first free end 4 and a second free end 5. Seated in an interior space 6 of the winding tube 2 as a torsional tensioning device is a spiral torsion spring 7.

Arranged in the region of the first free end 4 of the winding tube 2 is a bearing plug 8 which is arranged so as to be rotationally fixed and axially fixed with respect to the winding tube 2. The bearing plug 8 has a bearing journal 9 which is rotatably mounted in a corresponding counter bearing (not shown).

At the opposite, second free end 5, a bearing sleeve 10 is connected in a rotationally fixed and axially fixed manner to the winding tube 2. The bearing sleeve 10 is rotationally fixedly and axially fixedly mounted at the outer side in the splined shaft, multi-tooth or polygonal profile of the winding tube 2, and forms a plain bearing for the bearing piece 11. Arranged within the bearing sleeve 10 is a bearing piece 11 which is mounted so as to be axially fixed with respect to the bearing sleeve 10, that is to say also with respect to the winding tube 2. The winding tube 2 is mounted so as to be rotatable with respect to the bearing piece 11. The bearing piece 11 has for example a bearing journal 12 which extends a short distance beyond the free end 5 of the winding tube 2 in the longitudinal direction of the latter, and is mounted in a preferably rotationally fixed and axially fixed manner for example in a body section 13 of a vehicle body. The bearing piece 11 can expediently also be a part of a body region, for example part of a holding frame.

At the other end, the bearing piece 11 has a fastening device 14 for a first end 7a of the spiral torsion spring 7. The fastening device 14 of the bearing piece 11 preferably projects into the interior space 6 of the winding tube 2. A second free end 7b of the spiral torsion spring 7 is connected no a second fastening device 15, with the second fastening device 15 being rotationally fixedly and axially fixedly connected to a thrust piece 16.

Figure 2:
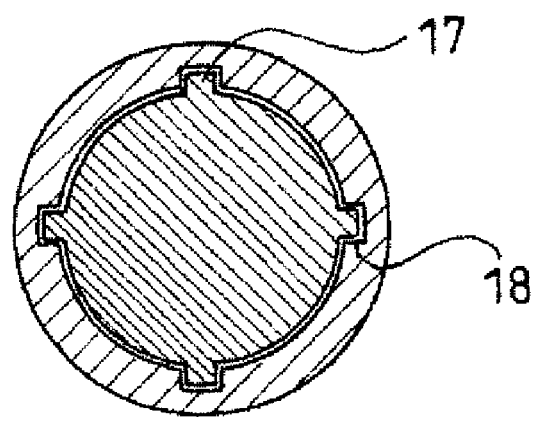
FIG. 2 shows a cross section through the winding shaft as per FIG. 1 along the line A-A.

The thrust piece 16 is seated in the interior space 6 of the winding tube 2 and is coupled to the latter in a rotationally fixed and longitudinally movable manner. The thrust piece 16 has, for example at the outer periphery, a plurality of projections 17 (compare FIG. 2) which correspond to corresponding spline grooves 18 on an inner side 19 of the winding tube 2. The spline grooves 18 can extend over the entire length of the winding tube 2 at its inner side, such that the winding tube 2 can particularly preferably be embodied as an extruded component, for example as a plastic extruded pipe or as a continuously case part formed from aluminum, which makes particularly favorable production of the winding tube 2 possible.

The thrust piece 16 is rotationally fixedly connected to the winding tube 2 in all operating positions, and is at the same time mounted within the winding tube 2 so as to be movable in a double arrow direction 20 parallel to the extent of the central longitudinal axis 3 of the winding shaft 1. The material of the thrust piece 16 and the material of the winding tube 2 is expediently coordinated with one another in such a way that, even in the event of rotationally distorted loading of the thrust piece 16, a small degree of mobility of the thrust piece 16 with respect to the winding tube 2 is ensured. Suitable lubrication is ensured if appropriate.

If, as the roller blind web is unwound from or culled from the winding tube 2, the spiral torsion spring 7 is tensioned in a torsional manner about its longitudinal axis 3, an elongation of the spiral torsional spring 7 takes place at the same time as already explained above, which results in a pressure loading on the thrust piece 16, to the right in FIG. 1. The thrust piece 16 gives way to said pressure loading by sliding in the spline grooves 18 of the winding tube 2. Distortion-free mounting of the spiral torsion spring 7 in the axial direction is therefore ensured. As the roller blind is wound up by means of the winding tube 2, the spiral torsion spring 7 is shortened in relation to the unwound state, which is compensated by the thrust piece 16 by sliding along in the double arrow direction 20—to the left in FIG. 1.

For mounting the thrust piece 16 with respect to the winding tube 2, all connections which ensure a rotationally fixed yet axially longitudinally movable mounting of the thrust piece 16 with respect to the winding tube 2 are suitable.

It has also been particularly well proven to guide the grooves 18 or the corresponding multi-tooth channels and/or polygon longitudinal tracks over the entire length of the winding tube 2, in particular the inner side of the winding tube 2, with it also being possible for the channels, tracks or grooves to serve for the rotationally fixed fastening of the bearing plug 8 and of the bearing sleeve 10 with respect to the winding tube 2.

According to one particularly preferred embodiment, a damping element 22 is arranged in the region of the spiral torsion spring so as to surround the latter, which damping element 22 ensures, curing operation of, the winding shaft 1, that windings of the spiral torsion spring 7 do not come into contact with the inner side 19 of the winding tube 2, and further improved acoustics are therefore ensured.

Figure 3:
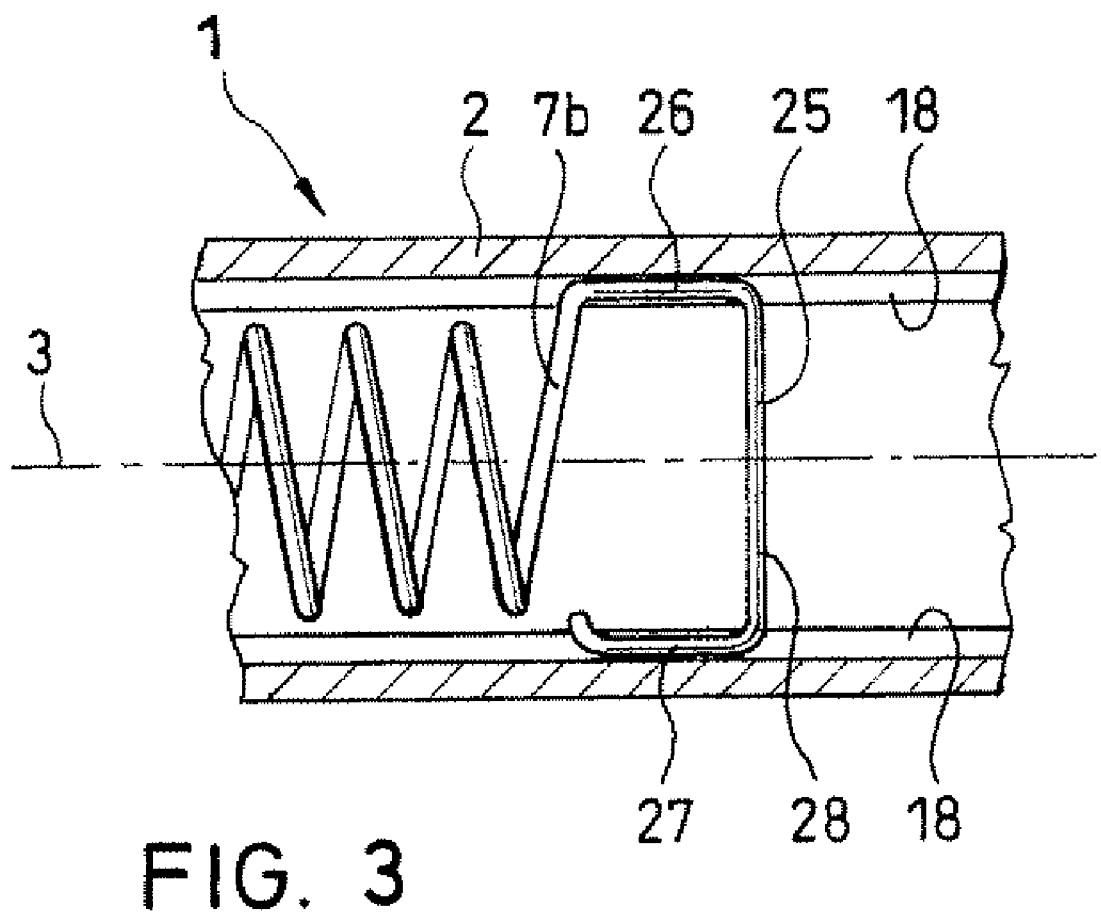
FIG. 3 shows a second embodiment of the winding shaft according to the invention.

According to one particularly preferred embodiment (FIG. 3), the spiral torsion spring 7 has, in the region of its free end 7b, a bearing bracket 25 which is preferably formed in one piece with, and so as to be bent from, the spring wire of the spiral torsion spring 7. The bearing bracket 25 has a first bearing section 26 and a second bearing section 27 which run for example parallel to the central longitudinal axis 3 and, in the assembled state of the winding shaft 1, engage into the grooves 18. The bearing webs 26 and 27 are connected to one another by means of a connecting web 28. Rotationally fixed yet axially longitudinally movable mounting of the free end 7b of the spiral torsion spring 7 with respect to the winding tube 2 is likewise ensured by means of said embodiment. A particular advantage of said embodiment is that the thrust piece 16 can be dispensed with here.

A particular advantage of the invention is that the spiral torsion spring 7 does not undergo an axial preload, that is to say neither a tensile preload nor a compressive preload, in any operating position, which leads to particularly low-noise operation of the winding shaft according to the invention. It is also particularly advantageous that, in contrast to the prior art as per DE 196 40 846, pressing of the thrust piece with the winding tube does not take place, so that adverse effects on the true running or the alignment of the winding tube by the pressing action are avoided. Complex true running checks and if appropriate complex and expensive alignment processes for re-establishing the true running of the winding shaft 1 are avoided. It is also advantageous that a plastic extruded profile can be used for the winding shaft according to the invention, which permits a particularly favorable, light design, which is easy to handle during assembly, of the winding shaft 1.

A further advantage is that the introduction of torque for the winding-up of the roller blind web by means of the winding shaft 1 takes place in a central region of the winding tube 2 between the end-side bearing plug 8 and the bearing piece 11, which results in a particularly uniform winding-up process.

A further advantage of the invention is that the length of the spiral torsion spring 7 can be designed according to requirements, without having any influence on other components of the winding shaft 1. This arises from the fact that the thrust piece 16 can be positioned at any desired point within the winding tube 2 in the axial direction (double arrow direction 20).

It is also advantageous that the spiral torsion spring 7 need not be preloaded in the axial direction in order to counteract a length variation during the actuation of the winding shaft 1. This reduces the noises in operation.

It is also advantageous that the bearing shaft 10 and in particular its mounting in the body section 13 can be of particularly solid design, since a central bore for leading out a rotary shaft, as is required for example in the prior art as per DE 200 11 452 U1, is avoided. This results in the possibility of producing the bearing shaft from a more cost-effective material, for example plastic instead of die-cast zinc, which leads to a further cost reduction.

It is finally particularly advantageous than the winding shaft according to the invention can be pre-assembled and assembled in a particularly simple manner, with it being possible to dispense with complex true-running checks and if appropriate alignment processes or alignment activity to re-establish the necessary true running.

The invention claimed is:

1. A winding shaft for a roller blind device having a winding tube and having a torsional tensioning device which is coupled with a first end to the winding tube so as to be rotatable with respect to the winding tube, wherein the torsional tensioning device is coupled at least with a second end to the winding tube so as to be rotationally fixed and movable in a longitudinal direction with respect to the winding tube, such that the torsional tensioning device remains undistorted in the axial direction;
wherein the rotationally fixed and longitudinally movable coupling takes place by means of a splined shaft profile, and
wherein the torsional tensioning device consists of curved spring wire wherein one end of the curved spring wire is slidably disposed within at least one spline groove on an inner side of the winding tube so as to be longitudinally movable and rotationally fixed with respect to the winding tube.

2. The winding shaft of claim 1, wherein the torsional tensioning device is coupled to the winding tube in a longitudinally movable manner both in the region of the first end and also in the region of the second end.

3. The winding shaft of claim 1, wherein the torsional tensioning device is a spiral torsion spring.

4. The winding shaft of claim 1, wherein the torsional tensioning device is connected to the winding tube, so as to be longitudinally movable and rotationally fixed with respect to the winding tube, by means of a thrust piece.

5. The winding shaft of claim 1, wherein the torsional tensioning device is coupled directly to the winding tube so as to be longitudinally movable and rotationally fixed with respect to winding tube.

6. The winding shaft of claim 1, wherein the torsional tensioning device is arranged in an interior space of the winding shaft.

7. The winding shaft of claim 1, wherein the winding tube is embodied as a continuously cast or extruded profile, composed of plastic or aluminum.

8. The winding shaft of claim 1, wherein one end of the curved spring wire is slidably disposed within two spline grooves.

* * * * *